US012591463B2

(12) United States Patent
Shen et al.

(10) Patent No.: US 12,591,463 B2
(45) Date of Patent: Mar. 31, 2026

(54) DATA TRANSMISSION METHOD AND DATA TRANSMISSION SERVER

(71) Applicant: SHANGHAI BILIBILI TECHNOLOGY CO., LTD., Shanghai (CN)

(72) Inventors: Xiaojing Shen, Shanghai (CN); Honglei Cui, Shanghai (CN); Hanchao Zheng, Shanghai (CN); Biao Hu, Shanghai (CN); Hao Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 419 days.

(21) Appl. No.: 18/271,130

(22) PCT Filed: Jan. 5, 2022

(86) PCT No.: PCT/CN2022/070245
§ 371 (c)(1),
(2) Date: Jul. 6, 2023

(87) PCT Pub. No.: WO2022/148363
PCT Pub. Date: Jul. 14, 2022

(65) Prior Publication Data
US 2024/0069977 A1 Feb. 29, 2024

(30) Foreign Application Priority Data
Jan. 6, 2021 (CN) .......................... 202110011589.5

(51) Int. Cl.
*G06F 9/44* (2018.01)
*G06F 9/50* (2006.01)
*H04L 67/06* (2022.01)

(52) U.S. Cl.
CPC ........... *G06F 9/5055* (2013.01); *H04L 67/06* (2013.01)

(58) Field of Classification Search
CPC ................. G06F 9/5055; G06F 9/5027; G06F 2209/5018; G06F 2209/508; G06F 9/5038; H04L 67/06; H04L 67/01
(Continued)

(56) References Cited

U.S. PATENT DOCUMENTS 6,192,389 B1 2/2001 Ault et al.
9,923,996 B1 * 3/2018 Morris .................... H04L 69/16
(Continued)

FOREIGN PATENT DOCUMENTS

CN 103605568 A 2/2014
CN 104735077 A 6/2015
(Continued)

OTHER PUBLICATIONS

International Patent Application No. PCT/CN2022/070245; Int'l Search Report; dated Mar. 14, 2022; 3 pages.

*Primary Examiner* — Timothy A Mudrick
(74) *Attorney, Agent, or Firm* — BakerHostetler

(57) ABSTRACT

This application provides techniques comprising creating a main thread and at least two task threads; determining, by the main thread, a target task thread based on a data packet corresponding to a data transmission task in response to detecting the data transmission task associated with a client device, and sending the data packet to the target task thread, where the target task thread is any one of the at least two task threads; and receiving, by the target task thread, the data packet sent by the main thread, determining, based on the data packet, a first file descriptor corresponding to the client device, and communicating with the client device by using the first file descriptor to perform data transmission.

17 Claims, 5 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 2005/0125539 A1* | 6/2005 | Tripathi | ................ | H04L 69/163 |
| | | | | 709/227 |
| 2007/0061470 A1 | 3/2007 | Berg | | |

FOREIGN PATENT DOCUMENTS

| | | | |
|---|---|---|---|
| CN | 105426252 A | 3/2016 |
| CN | 106713320 A | 5/2017 |
| CN | 106941532 A | 7/2017 |
| CN | 108243222 A | 7/2018 |
| CN | 108259370 A | 7/2018 |
| CN | 105580334 B | 10/2018 |
| CN | 108702486 A | 10/2018 |
| CN | 109189595 A | 1/2019 |
| CN | 109947581 A | 6/2019 |
| CN | 110247863 A | 9/2019 |
| CN | 111314273 A | 6/2020 |
| CN | 111901689 A | 11/2020 |
| CN | 112631788 A | 4/2021 |

* cited by examiner

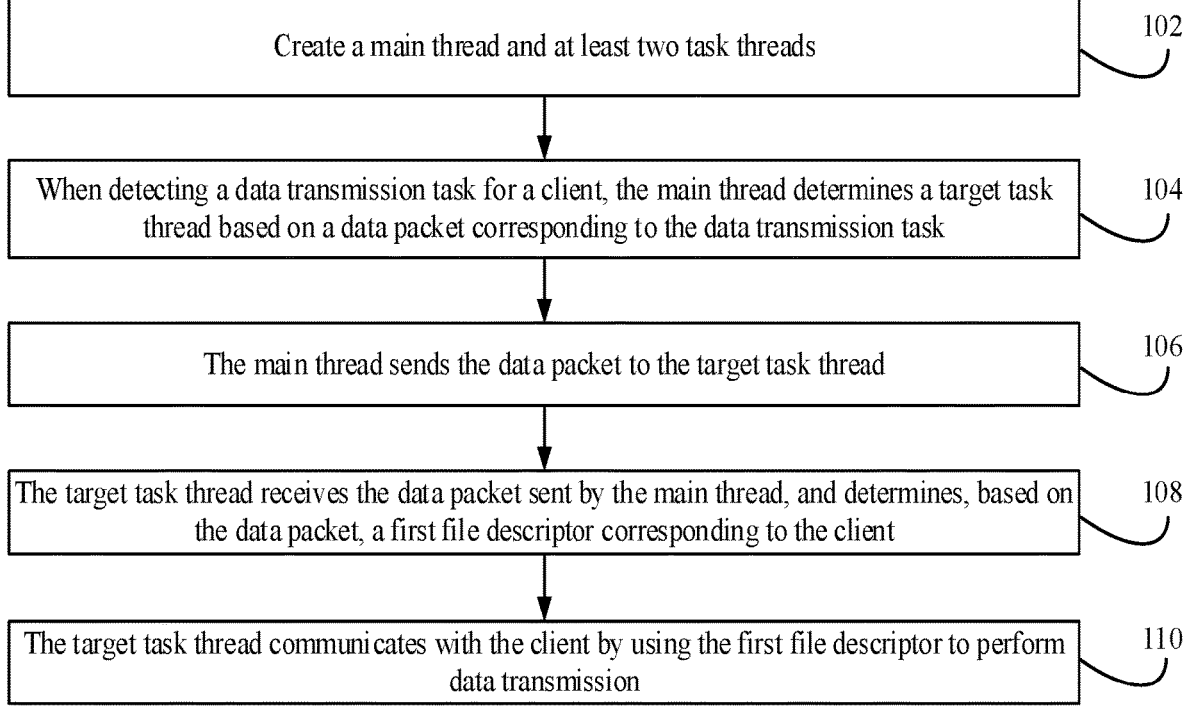

Create a main thread and at least two task threads — 102

When detecting a data transmission task for a client, the main thread determines a target task thread based on a data packet corresponding to the data transmission task — 104

The main thread sends the data packet to the target task thread — 106

The target task thread receives the data packet sent by the main thread, and determines, based on the data packet, a first file descriptor corresponding to the client — 108

The target task thread communicates with the client by using the first file descriptor to perform data transmission — 110

FIG. 1

DATA TRANSMISSION METHOD AND DATA TRANSMISSION SERVER

CROSS-REFERENCE TO RELATED APPLICATION

This application is the U.S. National Stage of International Application No. PCT/CN2022/070245, filed on Jan. 5, 2022, which claims priority to Chinese Patent Application No. 202110011589.5, filed on Jan. 6, 2021, and entitled "DATA TRANSMISSION METHOD AND DATA TRANSMISSION SERVER", both of which are incorporated herein by reference in their entireties.

TECHNICAL FIELD

This application relates to the field of Internet technologies, and in particular, to a data transmission method. This application also relates to a data transmission server, a computing device, and a computer-readable storage medium.

BACKGROUND

With rapid development of Internet technologies, various data transmission protocols emerge. A User Datagram Protocol (UDP) is a transport layer protocol whose function is to add most basic services: multiplexing, demultiplexing, and error detection to a packet service of the Internet Protocol (IP). The UDP has advantages that a TCP does not have: The UDP has no connection, and in terms of time, there is no delay required to establish the connection, and in terms of space, the TCP needs to maintain a connection status in an end system, and this requires specific overheads. This connection includes: receiving and sending buffers, a congestion control parameter, and parameters of a sequence number and an acknowledgment number. In the UDP, the connection status is not maintained, and these parameters are not tracked, and therefore, overheads are low. The UDP is advantageous in terms of both space and time. The UDP has no congestion control, an application layer can better control data to be sent and sending time, and congestion control in a network does not affect a sending rate of a host. Some real-time applications require a steady sending rate, and can tolerate some data losses, but cannot allow a large delay (such as a real-time video or live broadcasting). A UDP link is represented by a 5-tuple, and the 5-tuple is a source IP address, a destination IP address, a transport layer protocol (such as the TCP or the UDP), a source port, and a destination port.

In an existing technology, a bottom layer of the UDP protocol for transmitting data is to call a send to function or a send function. Currently, most UDP servers use the send to function to transmit data. The send to function has two more parameters than the send function: an address of a target socket and a length of the target socket. This means that more data needs to be copied to kernel space in each time of system calling. In addition, after parameters reach the kernel space, a kernel further needs to initialize some temporary data structures to store values of the parameters, and after sending a data packet, the kernel further needs to release these temporary data structures when appropriate. In addition, transmitting data by using a 5-tuple (or a 7-tuple) carried in a UDP link makes it difficult to simultaneously process a large quantity of data packets of different sources.

SUMMARY

In view of this, embodiments of this application provide a data transmission method. This application also relates to a data transmission server, a computing device, and a computer-readable storage medium, to resolve a problem of excessively large consumption of kernel resources in an existing technology.

According to a first aspect of embodiments of this application, a data transmission method is provided, including:
creating a main thread and at least two task threads;
  determining, by the main thread when detecting a data transmission task for a client device, a target task thread based on a data packet corresponding to the data transmission task, and sending the data packet to the target task thread, where the target task thread is any one of the at least two task threads; and
  receiving, by the target task thread, the data packet sent by the main thread, determining, based on the data packet, a first file descriptor corresponding to the client device, and communicating with the client device by using the first file descriptor to perform data transmission.

According to a second aspect of embodiments of this application, a data transmission server is provided, including:
  a thread creation module, configured to create a main thread and at least two task threads;
  a sending module, configured to: determine, by the main thread when detecting a data transmission task for a client device, a target task thread based on a data packet corresponding to the data transmission task, and send the data packet to the target task thread, where the target task thread is any one of the at least two task threads; and
  a communication module, configured to: receive, by the target task thread, the data packet sent by the main thread, determine, based on the data packet, a first file descriptor corresponding to the client device, and communicate with the client device by using the first file descriptor to perform data transmission.

According to a third aspect of embodiments of this application, a computing device is provided, including:
  a memory and a processor, where
    the memory is configured to store computer executable instructions, and the processor is configured to execute the computer executable instructions to implement the following method:
  creating a main thread and at least two task threads;
  determining, by the main thread when detecting a data transmission task for a client device, a target task thread based on a data packet corresponding to the data transmission task, and sending the data packet to the target task thread, where the target task thread is any one of the at least two task threads; and
  receiving, by the target task thread, the data packet sent by the main thread, determining, based on the data packet, a first file descriptor corresponding to the client device, and communicating with the client device by using the first file descriptor to perform data transmission.

According to a fourth aspect of embodiments of this application, a computer-readable storage medium is provided, and the computer-readable storage medium stores computer executable instructions. When the instructions are executed by a processor, any step of the data transmission method is implemented.

According to the data transmission method provided in this application, a main thread and at least two task threads may be created; when a data transmission task for a client device is detected, a target task thread may be determined by the main thread based on a data packet corresponding to the data transmission task; the data packet is sent to the target task thread, where the target task thread is any one of the at least two task threads; the data packet sent by the main thread may be received by the target task thread; a first file descriptor corresponding to the client device is determined based on the data packet; and communication is performed with the client device by using the first file descriptor to perform data transmission. In this case, data transmission with different client devices can be processed by using a plurality of task threads, so that a relatively large quantity of data packets of different sources are simultaneously processed. In addition, communication is performed with the client device in a form of creating and monitoring the file descriptor, so that it is not necessary to copy excessive resources to a kernel, and a relatively small quantity of kernel resources can be used to implement an efficient data transmission method, thereby reducing kernel resource consumption of the server.

BRIEF DESCRIPTION OF DRAWINGS

FIG. 1 is a flowchart of a data transmission method according to an embodiment of this application;

DESCRIPTION OF EMBODIMENTS

Figure 2:
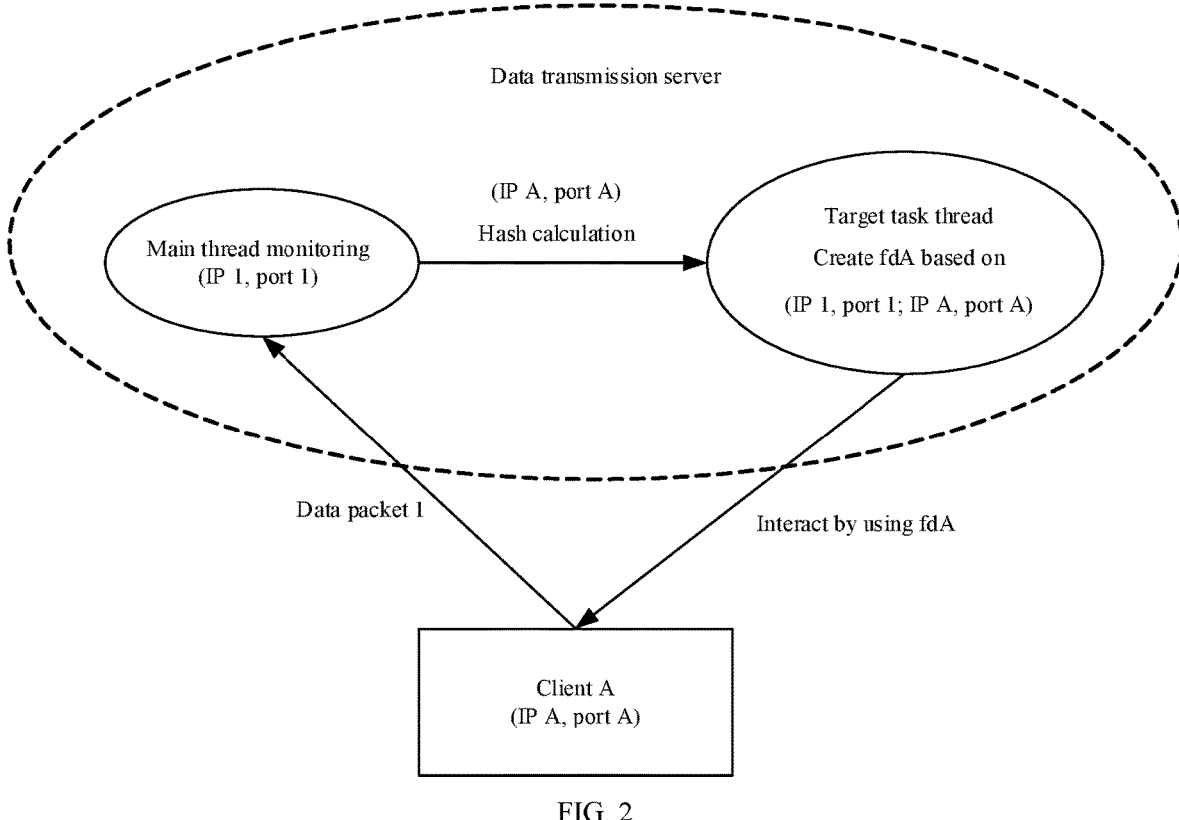
FIG. 2 is a schematic flowchart of communication performed based on a data transmission server according to an embodiment of this application.

In the following description, numerous specific details are set forth to facilitate full understanding of this application. However, this application can be implemented in many other manners different from those described herein, and a person skilled in the art can make similar promotion without departing from the connotation of this application. Therefore, this application is not limited to specific implementations disclosed below.

Terms used in one or more embodiments of this application are merely used to describe specific embodiments, but are not intended to limit the one or more embodiments of this application. Singular forms "one", "the", and "this" used in the one or more embodiments of this application and the appended claims are also intended to include plural forms, unless another meaning is clearly indicated in the context. It should be further understood that the term "and/or" used in the one or more embodiments of this application indicates and includes any one of or all possible combinations of one or more associated listed items.

It should be understood that although the terms such as "first" and "second" may be used in the one or more embodiments of this application to describe various information, the information should not be limited to these terms. These terms are merely used to distinguish between information of a same type. For example, without departing from the scope of the one or more embodiments of this application, "first" may also be referred to as "second", and similarly, "second" may also be referred to as "first". Depending on the context, for example, the word "if" used herein may be explained as "while", "when", or "in response to determining".

Terms used in the one or more embodiments of this application are explained first.

UDP is an acronym of User Datagram Protocol, is a connectionless transport layer protocol in an open system interconnection (OSI) reference model, and provides a transaction-oriented service for transferring simple and unreliable information. In a network, the UDP is used to process a data packet like a TCP, and is a connectionless protocol. In the OSI model, the UDP is at a fourth layer, that is, a transport layer, and is located at a layer above an IP protocol.

The Transmission Control Protocol (TCP) is a connection-oriented (connection-directed), reliable, and byte stream-based transport layer (Transport layer) communication protocol, and in a simplified OSI model of a computer network, the TCP implements a function specified by the fourth layer, that is, the transport layer. The TCP is designed to accommodate a hierarchical protocol layer structure that supports multi-network applications, and paired processes in host computers connected to different but interconnected computer communication networks rely on the TCP to provide reliable communication services.

Socket: A socket is abstraction of end points for bidirectional communication between application processes on different hosts in a network. One socket is one end of process communication in the network, and provides a mechanism for an application layer process to exchange data by using a network protocol. In terms of a position, the socket is connected to the application process in an uplink and is connected to a network protocol stack in a downlink, is an interface used by an application program to perform communication by using the network protocol, and is an interface used by the application program to interact with the network protocol.

An operating system (OS) is a computer program that manages computer hardware and software resources, and is an interface between a user and a computer hardware system. The operating system needs to deal with such basic affairs as managing and configuring a memory, determining priorities of system resource supplies and demands, controlling an input device and an output device, operating a network, and managing a file system. The operating system also provides an operating interface for the user to interact with the system. With the help of the operating system, the user can quickly, effectively, securely, and reliably manipulate various resources in a computer system to process a program of the user.

A kernel (kernel) is the most basic part of the operating system, and is a part of software that provides secure access to computer hardware for many application programs. Such access is limited, and the kernel determines a time point and duration in which a program operates on a specific part of the hardware. The kernel is the core of an operating system, is a first layer of software expansion based on hardware, provides most basic functions of the operating system, is the basis for working of the operating system, and is responsible for managing a process, a memory, and a kernel system structure of the system and determines performance and stability of the system.

File descriptor (fd): The kernel accesses a file by using a file descriptor (fd), and the file descriptor is a non-negative integer and is actually an index value that points to a record table that is maintained by the kernel for each process and that is used by the process to open a file. When a program opens an existing file or creates a new file, the kernel returns a file descriptor to the process. In program designing, some programs related to an underlying layer are usually written based on the file descriptor. The file descriptor (fd) is generally used in BSD Socket and is used in a Unix/Linux system. In the Unix/Linux system, a socket handle can be regarded as a file. Receiving and sending data on the socket is equivalent to reading and writing a file. Therefore, a socket handle is usually represented by an fd representing a file handle. When the fd is read, an identifier of a corresponding port of the socket handle can be obtained.

This application provides a data transmission method. This application also relates to a data transmission server, a computing device, and a computer-readable storage medium. The data transmission method, the data transmission server, the computing device, and the computer-readable storage medium are described in detail one by one in the following embodiments.

FIG. 1 is a flowchart of a data transmission method according to an embodiment of this application. As shown in FIG. 1, the method specifically includes the following steps.

Step 102: Create a main thread and at least two task threads.

In actual application, currently most UDP servers use a send to function to transmit data. The send to function has two more parameters than a send function: an address of a target socket and a length of the target socket. This means that more data needs to be copied to kernel space in each time of system calling. In addition, after parameters reach the kernel space, a kernel further needs to initialize some temporary data structures to store values of the parameters, and after sending a data packet, the kernel further needs to release these temporary data structures when appropriate. In addition, transmitting data by using a 5-tuple (or a 7-tuple) carried in a UDP link makes it difficult to simultaneously process a large quantity of data packets of different sources.

Therefore, this application provides a data transmission method. A main thread of a data transmission server may determine, when a data transmission task for a client device is detected, a target task thread based on a data packet corresponding to the data transmission task, and send the data packet to the target task thread, where the target task thread is any one of at least two task threads included in the data transmission server; and then, the target task thread receives the data packet sent by the main thread, determines, based on the data packet, a first file descriptor corresponding to the client device, and communicates with the client device by using the first file descriptor to perform data transmission. In this case, data transmission with different client devices can be processed by using a plurality of task threads, so that a relatively large quantity of data packets of different sources are simultaneously processed. In addition, communication is performed with the client device in a form of creating and monitoring the file descriptor, so that it is not necessary to copy excessive resources to a kernel, and a relatively small quantity of kernel resources can be used to implement an efficient data transmission method, thereby reducing kernel resource consumption of the server.

It should be noted that the data transmission server may create one main thread and at least two task threads, the main thread is used to monitor first-time communication between the data transmission server and each client device, and the task thread is used to communicate with a specific client device for subsequent data transmission. The data transmission server is a transmission server deployed on a super node, and the super node is a type of machine with high bandwidth and large storage. The data transmission server deployed on the super node features a high throughput and high concurrent data transmission. The data transmission service is implemented based on a UDP protocol.

Step 104: When detecting a data transmission task for a client device, the main thread determines a target task thread based on a data packet corresponding to the data transmission task.

Specifically, on the basis of creating the main thread and the at least two task threads, when the data transmission task for the client device is detected, the data transmission server further determines the target task thread based on the data packet corresponding to the data transmission task by using the main thread. The target task thread is any one of the at least two task threads created by the data transmission server.

It should be noted that the data transmission task for the client device may be that the server detects a data packet sent by the client device to the server, or may be that the server generates a data packet to be actively sent to the client device. Therefore, the data transmission task for the client device may be that the server actively interacts with the outside, or may be that the server passively receives interaction of the client device. Therefore, the data packet corresponding to the data transmission task may be a data packet transmitted by the client device to the server, or may be a data packet that is actively generated by the server and that is to be transmitted to the client device.

In an optional implementation of this embodiment, the data transmission server may monitor a local port to determine whether the data packet sent by the client device is received. In other words, before the main thread determines, when the data transmission task for the client device is detected, the target task thread based on the data packet corresponding to the data transmission task, the method further includes:

creating a second file descriptor corresponding to a data transmission server, and monitoring the second file descriptor; and determining, when a data packet sent by the client device by using the second file descriptor is detected, that the data transmission task is detected.

In an optional implementation of this embodiment, a specific implementation process of creating the second file descriptor corresponding to the data transmission server may be as follows:

obtaining an address and the port number of the data transmission server; and creating, based on the address and the port of the data transmission server, the second file descriptor corresponding to the data transmission server.

Specifically, the address of the data transmission server is an IP address of the data transmission server. A corresponding second file descriptor may be created based on a local IP address of the data transmission server and a public communication port, and the second file descriptor may be monitored to monitor a communication port of the server. If a client device reads the second file descriptor and sends a data packet by using the second file descriptor, the server can detect the data packet, and the data packet carries an address and a port number of the source client device and an address and a port number of the destination data transmission server. When the server detects the data packet sent by the client device by using the second file descriptor, it indicates that the client device sends the data packet to the server by using the second file descriptor, that is, the data transmission task is generated.

It should be noted that when monitoring the port of the data transmission server, a data packet sent by each client device to the data transmission server needs to be detected. Therefore, during creation of the second file descriptor, it is only necessary to restrict the address and the port of the data transmission server, and it is not necessary to restrict the address and the port of the client device. In other words, during creation of the second file descriptor corresponding to the data transmission server, it is only necessary to create the second file descriptor based on the address and the port of the data transmission server. In other words, the main thread created by the data transmission server may create a second file descriptor based on a local address and a local port, and monitor the file descriptor, so that a data packet sent by each client device (such as a client device A, a client device B, or a client device C) to the data transmission server may be detected.

In addition, the detected data packet sent by the client device by using the second file descriptor is a first data packet sent by the client device to the server.

In an optional implementation of this embodiment, the data transmission server may also actively interact with the outside. In this case, before the main thread determines, when the data transmission task for the client device is detected, the target task thread based on the data packet corresponding to the data transmission task, the method further includes:

in response to a trigger request for the data transmission task, generating, based on an address and a port number of the client device, a data packet used for communicating with the client device; and when the data packet is generated, determining that the data transmission task is detected.

It should be noted that the client device is a client device with which the server needs to interact. The server may actively generate a data packet that needs to be transmitted to a specific client device, and the data packet carries an address and a port number of the destination client device. After the server generates the data packet, a data transmission task for the client device is detected.

In addition, the server actively interacts with the outside. To be specific, there needs to be a corresponding trigger request when the server actively transmits the data packet to the client device, and the server responds to the trigger request and generates a corresponding data packet only when the server detects the trigger request. The trigger request may carry the address and the port number of the client device. Based on the trigger request, the data transmission server may learn a client device (that is, a destination client device) that needs to be actively interacted with, to generate a corresponding data packet to perform data transmission.

For example, the trigger request may be a trigger request corresponding to a timed task. It is assumed that there is the following timed task: sending the news of the day to the client device A at 8 o'clock every day, and in this case, a trigger request for actively communicating with the client device A is generated at 8 o'clock every day. Alternatively, the trigger request may be a trigger request corresponding to update of entertainment news, and in this case, a trigger request for actively communicating with the client device A is generated whenever the entertainment news is updated. The trigger request carries an address and a port number of the client device A. In response to the trigger request, the main thread created by the data transmission server generates, based on the address and the port number of the client device A, a data packet to be sent to the client device A. In this case, a data transmission task for the client device A is detected.

In this application, the data transmission server can not only allocate a corresponding target task thread to the client device when receiving a data packet sent by the client device, but can also allocate a corresponding target task thread to the client device when a data packet needs to be actively sent to the client device. This interaction mode is flexible, and can meet complexity and flexibility of an actual scenario.

In an optional implementation of this embodiment, the data packet carries the address and the port number of the client device, and a specific implementation process of the determining a target task thread based on a data packet corresponding to the data transmission task may be as follows:

performing hash calculation based on the address and the port of the client device that are carried in the data packet, and determining a target task thread corresponding to the client device.

It should be noted that if the data packet is a data packet sent by the client device, the data packet carries an address and a port number of the source client device. In this case, the hash calculation may be performed based on the address and the port of the source client device, and a task for communicating with the source client device may be allocated to a corresponding target task thread. If the data packet is a data packet that is generated by the server and that is to be sent to the client device, the data packet carries an address and a port number of the destination client device. In this case, the hash calculation may be performed based on the address and the port of the destination client device, and a task for communicating with the destination client device may be allocated to a corresponding target task thread.

In an optional implementation of this embodiment, a specific implementation process of the performing hash calculation based on the address and the port of the client device that are carried in the data packet, and determining a target task thread corresponding to the client device may be as follows:

determining a hash value corresponding to the address and the port of the client device by using a hash algorithm;

determining a quantity of task threads;

performing a modulo operation on the quantity of task threads by using the hash value, to obtain a thread index; and determining the target task thread based on the thread index.

In this application, the data transmission server may create the main thread, is responsible for monitoring a local address and a local port, and after detecting a data packet sent by a specific client device or generating a data packet to be sent to a specific client device, forward the data packet to a corresponding target task thread, so that the target task thread can subsequently establish communication with the corresponding client device to perform data transmission. In this way, data transmission with different client devices can be processed by using a plurality of task threads, so that a relatively large quantity of data packets of different sources are simultaneously processed.

Step 106: The main thread sends the data packet to the target task thread.

Specifically, on the basis of determining, by the main thread when detecting the data transmission task for the client device, the target task thread based on the data packet corresponding to the data transmission task, the data packet is further sent by the main thread to the target task thread, so that the target task thread can subsequently establish communication with the corresponding client device.

Step 108: The target task thread receives the data packet sent by the main thread, and determines, based on the data packet, a first file descriptor corresponding to the client device.

Specifically, on the basis of sending the data packet to the target task thread by the main thread, the first file descriptor corresponding to the client device is further determined by the target task thread based on the data packet.

It should be noted that a socket handle can be regarded as a file. Receiving and sending data on the socket is equivalent to reading and writing a file. Therefore, a socket handle is usually represented by a file descriptor (fd) representing a file handle. In other words, when the file descriptor (fd) is read, an identifier of a corresponding port of the socket handle can be obtained, to perform communication. Therefore, to communicate with the client device, the target task thread needs to first determine and monitor the first file descriptor corresponding to the client device.

In an optional implementation of this embodiment, it may be first determined whether a corresponding first file descriptor has been created for the client device before. In other words, a specific implementation process of the determining, based on the data packet, a first file descriptor corresponding to the client device may be as follows:

obtaining the address and the port of the client device that are carried in the data packet;

determining, based on the address and the port of the client device, whether there is the first file descriptor corresponding to the client device;

communicating with the client device by using the first file descriptor when there is the first file descriptor corresponding to the client device; and when there is no first file descriptor corresponding to the client device, creating, based on the address and the port of the server and the address and the port of the client device, the first file descriptor corresponding to the client device, and communicating with the client device by using the first file descriptor.

It should be noted that, when receiving the data packet, the target task thread may first determine whether the first file descriptor has been created for the client device before, and if the first file descriptor has been created before, the target task thread may directly re-use and monitor the first file descriptor to implement communication with the corresponding client device. If the corresponding first file descriptor has not been created before, the first file descriptor corresponding to the client device first needs to be created based on the address and the port of the server and the address and the port of the client device, and then monitoring is performed to implement communication.

Because the target task thread is used to communicate with a specific client device, that is, not all client devices can communicate with the target task thread by using the created first file descriptor, during creation of the first file descriptor, it is necessary to combine the address and the port of the server and the address and the port of the client device to ensure that the target task thread can communicate with the corresponding client device to perform data transmission. In other words, after the main thread distributes, to each task thread, information packets sent by client devices, a single task thread is responsible for processing only an information packet of a specific client device (for example, the client device A), and the task thread creates a first file descriptor dedicated for communication with the client device A based on a source address, a source port (the client device A), and a locally monitored address and port, and then communicates with the client device A by using the file descriptor.

In this application, after detecting the data packet sent by the client device, the main thread may forward the data packet to the corresponding target task thread, and the target task thread may create the first file descriptor for communicating with the client device, and may subsequently communicate with the client device by using the first file descriptor to perform data transmission. In this way, data transmission with different client devices can be processed by using a plurality of task threads, so that a relatively large quantity of data packets of different sources are simultaneously processed.

Step 110: The target task thread communicates with the client device by using the first file descriptor to perform data transmission.

Specifically, on the basis of receiving, by the target task thread, the data packet sent by the main thread and determining the first file descriptor corresponding to the client device based on the data packet, the target task thread further communicates with the client device by using the first file descriptor to perform data transmission.

For example, FIG. 2 is a schematic flowchart of communication performed based on the data transmission server according to an embodiment of this application. As shown in FIG. 2, the main thread creates and monitors the second file descriptor based on an address and a port number (IP 1, port 1) of the main thread; when it is detected that the client device A sends a data packet 1 to (IP 1, port 1) of the data transmission server by using (IP A, port A), the main thread performs hash calculation based on (IP A, port A) to determine a corresponding target task thread; and the target task thread creates a corresponding first file descriptor fdA based on (IP 1, port 1; IP A, port A), and the target task thread interacts with the client device A by using the first file descriptor fdA.

Figure 3:
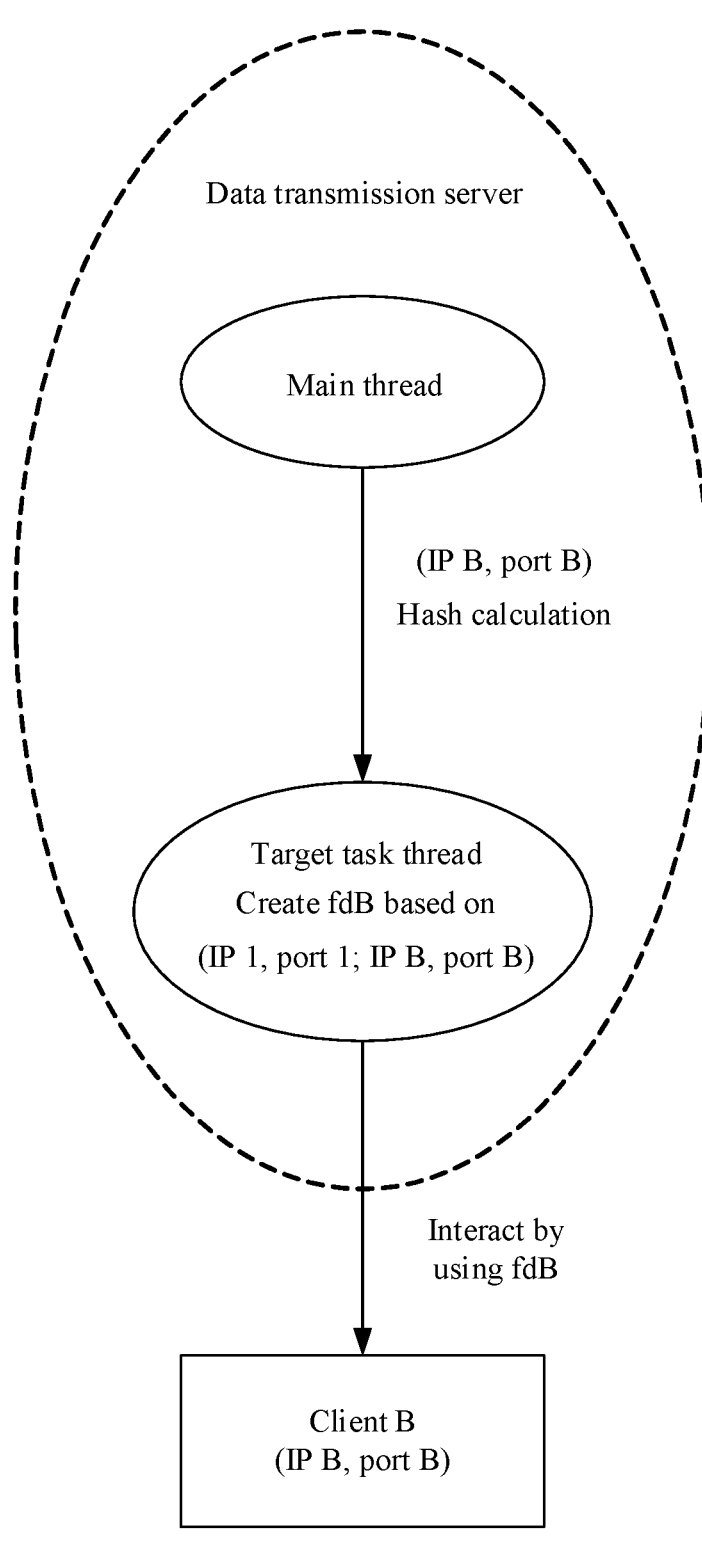
FIG. 3 is a schematic flowchart of external communication performed based on a data transmission server according to an embodiment of this application.

For example, FIG. 3 is a schematic flowchart of external communication performed based on the data transmission server according to an embodiment of this application. As shown in FIG. 3, the main thread performs hash calculation based on an address and a port number (IP B, port B) of a destination client device, and determines a corresponding target task thread; the target task thread creates a corresponding first file descriptor fdB based on (IP 1, port 1; IP B, port B), where (IP 1, port 1) is an address and a port number of the data transmission server; and the target task thread actively interacts with the client device B by using the first file descriptor fdB.

It should be noted that communicating with the client device by using the first file descriptor to perform data transmission means that the first file descriptor is monitored, so that the client device sends a data packet to the server by using the first file descriptor, or the server sends a data packet to the client device by using the first file descriptor.

In actual implementation, a kcp algorithm is used in application layer traffic control and congestion control of the data transmission server. The kcp algorithm is an open-source algorithm for providing application layer traffic control and congestion control. The kcp algorithm is a reliable transport layer ARQ protocol at a transport layer, and is designed to resolve a problem of a low network speed of a TCP protocol in network congestion. The kcp strives to improve a transmission speed while ensuring reliability. A focus of a kcp protocol is mainly to control data reliability and improve the transmission speed. Therefore, a lower layer transmission protocol is not specified in the kcp, and a UDP is usually used as the lower layer transmission protocol. A control header is added to a data packet of a kcp layer protocol on the basis of a UDP packet, and when user data is extremely large and is larger than a range that one UDP packet can bear (is larger than mss), the kcp stores the user data in a plurality of kcp packets in segments.

In an optional implementation of this embodiment, the target task thread may monitor the first file descriptor, and if there is no interaction between the target task thread and the client device for a long time, monitoring of the first file descriptor may further be canceled. In other words, a specific implementation process of the communicating with the client device by using the first file descriptor to perform data transmission may be as follows:

monitoring the first file descriptor;

determining whether there is data exchange for the first file descriptor within preset duration; and if no, stopping monitoring the first file descriptor.

Specifically, the preset duration is a preset time period, and if there is no data exchange for the first file descriptor in the time period, that is, the data packet sent by the client device by using the first file descriptor is not received, and the data transmission server does not send the data packet to the corresponding client device by using the first file descriptor, it indicates that the target task thread and the client device have not interacted with each other for a long time, and therefore monitoring of the first file descriptor can be stopped, to save resources.

In actual implementation, for the first file descriptor, epoll may be used for scheduling management, and the epoll is a mechanism for handling a read/write sequence of events in a case of a large quantity of concurrent connections. In addition, the preset duration may be set based on a specific service characteristic, that is, a policy that the first file descriptor expires after timing out is used, that is, if there is no data exchange for the first file descriptor for more than N seconds based on the service characteristic, monitoring of the first file descriptor is canceled.

According to the data transmission method provided in this application, a main thread of a data transmission server may determine, when a data transmission task for a client device is detected, a target task thread based on a data packet corresponding to the data transmission task, and send the data packet to the target task thread, where the target task thread is any one of at least two task threads included in the data transmission server; and then, the target task thread receives the data packet sent by the main thread, determines, based on the data packet, a first file descriptor corresponding to the client device, and communicates with the client device by using the first file descriptor to perform data transmission. In this case, data transmission with different client devices can be processed by using a plurality of task threads, so that a relatively large quantity of data packets of different sources are simultaneously processed. In addition, communication is performed with the client device in a form of creating and monitoring the file descriptor, so that it is not necessary to copy excessive resources to a kernel, and a relatively small quantity of kernel resources can be used to implement an efficient data transmission method, thereby reducing kernel resource consumption of the server.

Figure 4:
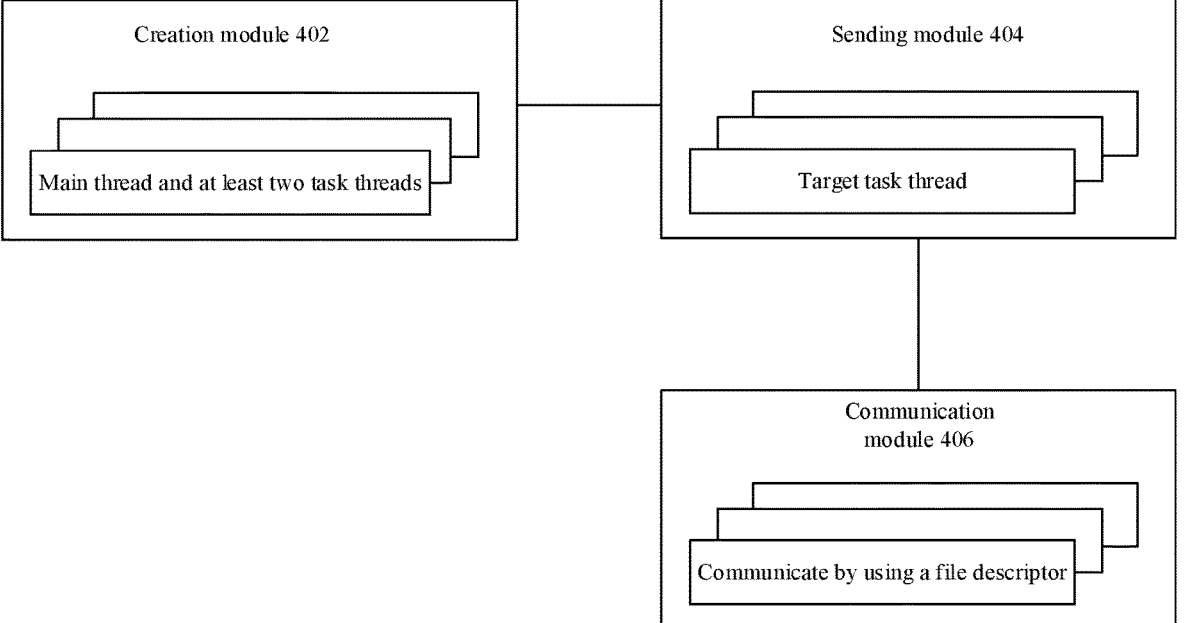
FIG. 4 is a structural block diagram of a data transmission server according to an embodiment of this application.

Corresponding to the embodiment of the data transmission method, this application further provides an embodiment of a data transmission server. FIG. 4 is a structural block diagram of a data transmission server according to an embodiment of this application. As shown in FIG. 4, the data transmission server includes:

a creation module 402, configured to create a main thread and at least two task threads;

a sending module 404, configured to: determine, by the main thread when detecting a data transmission task for a client device, a target task thread based on a data packet corresponding to the data transmission task, and send the data packet to the target task thread, where the target task thread is any one of the at least two task threads; and a communication module 406, configured to: receive, by the target task thread, the data packet sent by the main thread, determine, based on the data packet, a first file descriptor corresponding to the client device, and communicate with the client device by using the first file descriptor to perform data transmission.

In an optional implementation of this embodiment, the sending module 404 is further configured to:

create a second file descriptor corresponding to the server, and monitor the second file descriptor; and determine, when a data packet sent by the client device by using the second file descriptor is detected, that the data transmission task is detected.

In an optional implementation of this embodiment, the sending module 404 is further configured to:

in response to a trigger request for the data transmission task, generate, based on an address and a port number of the client device, a data packet used for communicating with the client device; and when the data packet is generated, determine that the data transmission task is detected.

In an optional implementation of this embodiment, the sending module 404 is further configured to:

obtain an address and a port number of the server; and create, based on the address and the port of the server, the second file descriptor corresponding to the server.

In an optional implementation of this embodiment, the data packet carries the address and the port number of the client device, and the communication module 406 is further configured to:

obtain the address and the port of the client device that are carried in the data packet;

determine, based on the address and the port of the client device, whether there is the first file descriptor corresponding to the client device;

communicate with the client device by using the first file descriptor when there is the first file descriptor corresponding to the client device; and when there is no first file descriptor corresponding to the client device, create, based on the address and the port of the server and the address and the port of the client device, the first file descriptor corresponding to the client device, and communicate with the client device by using the first file descriptor.

In an optional implementation of this embodiment, the communication module 406 is further configured to:

perform hash calculation based on the address and the port of the client device that are carried in the data packet, and determine a target task thread corresponding to the client device.

In an optional implementation of this embodiment, the communication module 406 is further configured to:

determine a hash value corresponding to the data packet by using a hash algorithm;

determine a quantity of task threads;

perform a modulo operation on the quantity of task threads by using the hash value, to obtain a thread index; and determine the target task thread based on the thread index.

In an optional implementation of this embodiment, the communication module 406 is further configured to:

monitor the first file descriptor;

determine whether a data packet sent by the client device by using the first file descriptor is received within second preset duration; and if no, stop monitoring the first file descriptor.

The data transmission server provided in this application may create a main thread and at least two task threads; when a data transmission task for a client device is detected, the data transmission server may determine a target task thread based on a data packet corresponding to the data transmission task by using the main thread, and send the data packet to the target task thread, where the target task thread is any one of the at least two task threads; and the data transmission server may receive, by using the target task thread, the data packet sent by the main thread, determine, based on the data packet, a first file descriptor corresponding to the client device, and communicate with the client device by using the first file descriptor to perform data transmission. In this case, data transmission with different client devices can be processed by using a plurality of task threads, so that a relatively large quantity of data packets of different sources are simultaneously processed. In addition, communication is performed with the client device in a form of creating and monitoring the file descriptor, so that it is not necessary to copy excessive resources to a kernel, and a relatively small quantity of kernel resources can be used to implement an efficient data transmission method, thereby reducing kernel resource consumption of the server.

The foregoing describes a schematic solution of the data transmission server in this embodiment. It should be noted that the technical solution of the data transmission server is of the same concept as the technical solution of the foregoing data transmission method. For details that are not described in detail in the technical solution of the data transmission server, reference may be made to the descriptions of the technical solution of the foregoing data transmission method.

Figure 5:
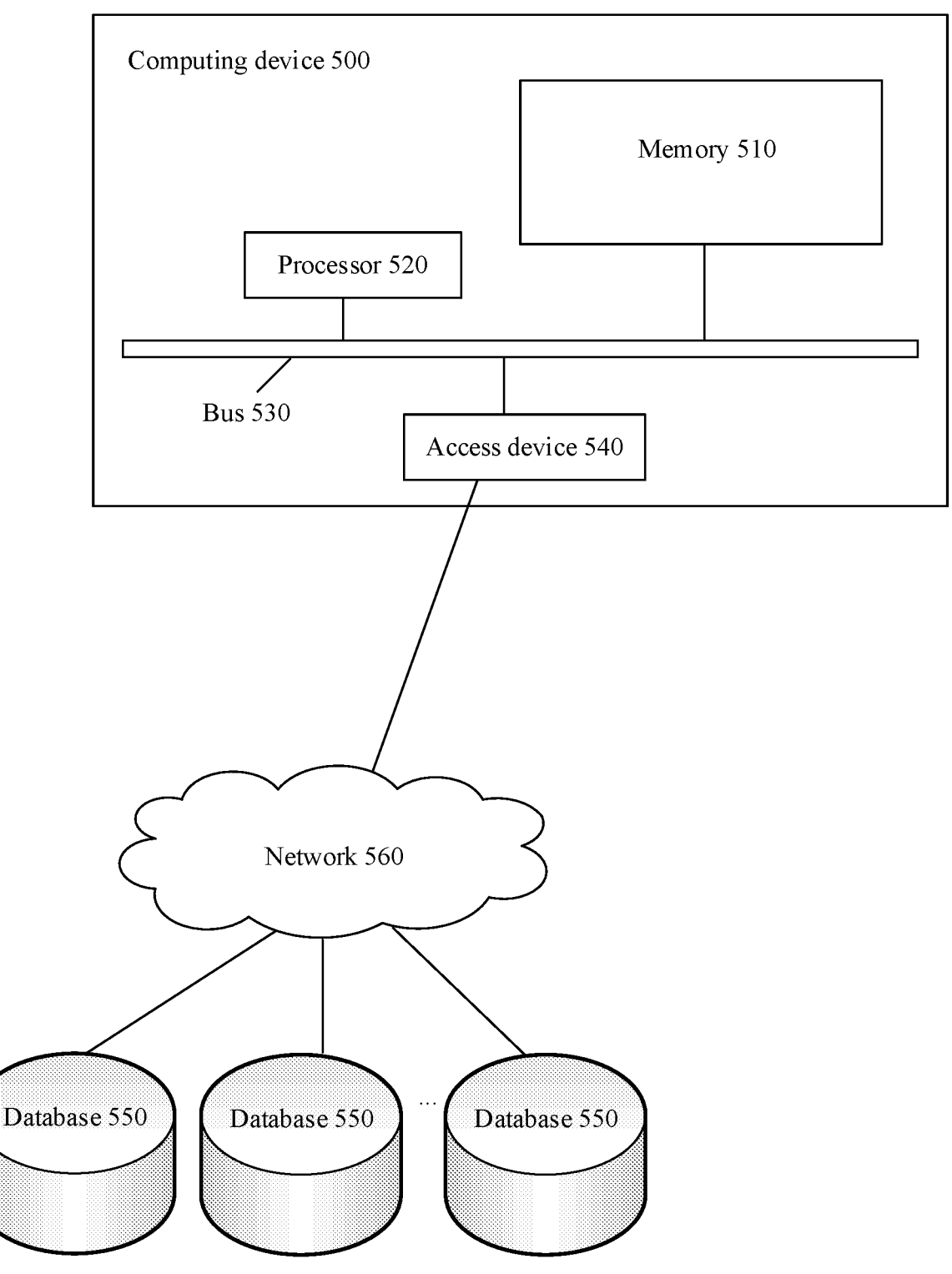
FIG. 5 is a structural block diagram of a computing device according to an embodiment of this application.

FIG. 5 is a structural block diagram of a computing device 500 used in embodiments of this application, such as used as the client device and/or the data transmission serve. Components of the computing device 500 include but are not limited to a memory 510 and a processor 520. The processor 520 and the memory 510 are connected by using a bus 530, and a database 550 is configured to store data.

The computing device 500 further includes an access device 540. The access device 540 enables the computing device 500 to communicate via one or more networks 560. Examples of these networks include a public switched telephone network (PSTN), a local area network (LAN), a wide area network (WAN), a private area network (PAN), or a combination of communication networks such as the Internet. The access device 540 may include one or more of any type of wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 500 and other components not shown in FIG. 5 may also be connected to each other, for example, by using a bus. It should be understood that the structural block diagram of the computing device shown in FIG. 5 is merely used as an example instead of a limitation on the scope of this application. A person skilled in the art can add or replace other components as required.

The computing device 500 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a stationary computing device such as a desktop computer or a PC. The computing device 500 may alternatively be a mobile or stationary server.

The processor 520 is configured to execute the following computer executable instructions to implement the following method:

creating a main thread and at least two task threads;

determining, by the main thread when detecting a data transmission task for a client device, a target task thread based on a data packet corresponding to the data transmission task, and sending the data packet to the target task thread, where the target task thread is any one of the at least two task threads; and receiving, by the target task thread, the data packet sent by the main thread, determining, based on the data packet, a first file descriptor corresponding to the client device, and communicating with the client device by using the first file descriptor to perform data transmission.

The foregoing describes a schematic solution of the computing device in this embodiment. It should be noted that the technical solution of the computing device is of the same concept as the technical solution of the foregoing data transmission method. For details that are not described in detail in the technical solution of the computing device, reference may be made to the descriptions of the technical solution of the foregoing data transmission method.

An embodiment of this application further provides a computer-readable storage medium. The computer-readable storage medium stores computer instructions, and the instructions are executed by a processor to:

create a main thread and at least two task threads;

determine, by the main thread when detecting a data transmission task for a client device, a target task thread based on a data packet corresponding to the data transmission task, and send the data packet to the target task thread, where the target task thread is any one of the at least two task threads; and receive, by the target task thread, the data packet sent by the main thread, determine, based on the data packet, a first file descriptor corresponding to the client device, and communicate with the client device by using the first file descriptor to perform data transmission.

The foregoing describes a schematic solution of the computer-readable storage medium in this embodiment. It should be noted that the technical solution of the storage medium is of the same concept as the technical solution of the foregoing data transmission method. For details that are not described in detail in the technical solution of the storage medium, reference may be made to the descriptions of the technical solution of the foregoing data transmission method.

The foregoing describes specific embodiments of this application. Other embodiments are within the scope of the appended claims. In some cases, actions or steps described in the claims may be performed in a sequence different from that in the embodiments and desired results can still be achieved. In addition, processes described in the accompanying drawings do not necessarily require a specific order or a sequential order shown to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that the content included in the computer-readable medium can be appropriately added or deleted based on requirements of the legislation and patent practice in a jurisdiction. For example, in some jurisdictions, based on the legislation and patent practice, the computer-readable medium does not include an electrical carrier signal or a telecommunication signal.

It should be noted that, for brief description, the foregoing method embodiments are represented as a combination of a series of actions. However, a person skilled in the art should be aware that this application is not limited to the described order of the actions, because according to this application, some steps may be performed in other orders or simultaneously. In addition, a person skilled in the art should also be aware that the embodiments described in the specification are all example embodiments, and involved actions and modules are not necessarily mandatory to this application.

In the foregoing embodiments, the descriptions of the embodiments have respective focuses. For a part that is not described in detail in an embodiment, reference may be made to related descriptions in other embodiments.

The example embodiments of this application disclosed above are merely intended to help describe this application. The optional embodiments neither describe all the details in detail, nor limit the present disclosure only to the specific implementations. Clearly, many modifications and variations may be made based on the content of this application. In this application, these embodiments are selected and specifically described to better explain the principle and practical application of this application, so that a person skilled in the art can well understand and use this application. This application is only subject to the claims and a full scope and equivalents thereof.

What is claimed is:

1. A data transmission method, comprising:
creating a main thread and at least two task threads by a data transmission server configured to implement data transmission based on a User Datagram Protocol (UDP);
determining, by the main thread performing hash calculation based on an address and a port number of a client device, a target task thread in response to detecting a data packet sent from the client device;
sending, by the main thread, the data packet to the target task thread, wherein the target task thread is one of the at least two task threads;
creating, by the target task thread, a first file descriptor corresponding to the client device based on the address and the port number of the client device and an address and a port number of the data transmission server; and
communicating, by the target task thread, with the client device by using the first file descriptor to perform data transmission.

2. The data transmission method according to claim 1, wherein before the determining, by the main thread, the target task thread, the data transmission method further comprising:
creating a second file descriptor corresponding to the data transmission server, and monitoring the second file descriptor; and
in response to detecting the data packet sent from the client device by using the second file descriptor, determining that a data transmission task is detected.

3. The data transmission method according to claim 1, wherein before the determining, by the main thread, the target task thread, the data transmission method further comprising:
in response to a trigger request for a data transmission task, generating the data packet for communicating with the client device based on the address and the port number of the client device; and
in response to determining that the data packet is generated, determining that the data transmission task is detected.

4. The data transmission method according to claim 2, wherein the creating a second file descriptor corresponding to the data transmission server comprises:
obtaining the address and the port number of the data transmission server; and
creating, based on the address and the port number of the data transmission server, the second file descriptor corresponding to the data transmission server.

5. The data transmission method according to claim 1, wherein the data packet carries the address and the port number of the client device, and wherein the method further comprises:
obtaining the address and the port of the client device that are carried in the data packet;
determining whether there exists the first file descriptor corresponding to the client device based on the address and the port of the client device;
in response to determining that there exists the first file descriptor corresponding to the client device, communicating with the client device by using the first file descriptor; and
in response to determining that the first file descriptor corresponding to the client device does not exist, creating the first file descriptor corresponding to the client device based on the address and the port number of the client device and the address and the port number of a data transmission server.

6. The data transmission method according to claim 1, wherein the performing hash calculation based on the address and the port number of the client device and determining the target task thread corresponding to the client device further comprises:
determining a hash value corresponding to the data packet by using a hash algorithm;
determining a quantity of task threads;
performing a modulo operation on the quantity of task threads by using the hash value, to obtain a thread index; and
determining the target task thread based on the thread index.

7. The data transmission method according to claim 1, wherein the communicating with the client device by using the first file descriptor to perform data transmission further comprises:
monitoring the first file descriptor;

determining whether there is data exchange for the first file descriptor within a preset duration; and stopping monitoring the first file descriptor in response to determining that there is no data exchange for the first file descriptor within the preset duration.

8. A computing device, comprising:

a memory and a processor, wherein the memory is configured to store computer executable instructions that upon execution by the processor cause the processor to perform operations comprising:

creating a main thread and at least two task threads by a data transmission server configured to implement data transmission based on a User Datagram Protocol (UDP);

determining, by the main thread performing hash calculation based on an address and a port number of a client device, a target task thread in response to detecting a data packet sent from the client device;

sending, by the main thread, the data packet to the target task thread, wherein the target task thread is one of the at least two task threads;

creating, by the target task thread, a first file descriptor corresponding to the client device based on the address and the port number of the client device and an address and a port number of the data transmission server; and communicating, by the target task thread, with the client device by using the first file descriptor to perform data transmission.

9. A non-transitory computer-readable storage medium, wherein the computer-readable storage medium stores computer instructions, and wherein the instructions upon execution by a processor cause the processor to implement operations comprising:

creating a main thread and at least two task threads by a data transmission server configured to implement data transmission based on a User Datagram Protocol (UDP);

determining, by the main thread performing hash calculation based on an address and a port number of a client device, a target task thread in response to detecting a data packet sent from the client device;

sending, by the main thread, the data packet to the target task thread, wherein the target task thread is one of the at least two task threads;

creating, by the target task thread, a first file descriptor corresponding to the client device based on the address and the port number of the client device and an address and a port number of the data transmission server; and communicating, by the target task thread, with the client device by using the first file descriptor to perform data transmission.

10. The computing device according to claim 8, wherein before the determining, by the main thread, the target task thread, the operations further comprise:

creating a second file descriptor corresponding to the data transmission server, and monitoring the second file descriptor; and in response to detecting the data packet sent from the client device by using the second file descriptor, determining that a data transmission task is detected.

11. The computing device according to claim 8, wherein before the determining, by the main thread, the target task thread, the operations further comprise:

in response to a trigger request for a data transmission task, generating the data packet for communicating with the client device based on the address and the port number of the client device; and in response to determining that the data packet is generated, determining that the data transmission task is detected.

12. The computing device according to claim 8, wherein the data packet carries the address and the port number of the client device, and wherein the operations further comprise:

obtaining the address and the port of the client device that are carried in the data packet;

determining whether there exists the first file descriptor corresponding to the client device based on the address and the port of the client device;

in response to determining that there exists the first file descriptor corresponding to the client device, communicating with the client device by using the first file descriptor; and in response to determining that the first file descriptor corresponding to the client device does not exist, creating the first file descriptor corresponding to the client device based on the address and the port number of the client device and the address and the port number of a data transmission server.

13. The computing device according to claim 8, wherein the communicating with the client device by using the first file descriptor to perform data transmission further comprises:

monitoring the first file descriptor;

determining whether there is data exchange for the first file descriptor within a preset duration; and stopping monitoring the first file descriptor in response to determining that there is no data exchange for the first file descriptor within the preset duration.

14. The non-transitory computer-readable storage medium claim 9, wherein before the determining, by the main thread, the target task thread, the operations further comprise:

creating a second file descriptor corresponding to the data transmission server, and monitoring the second file descriptor; and in response to detecting the data packet sent from the client device by using the second file descriptor, determining that a data transmission task is detected.

15. The non-transitory computer-readable storage medium claim 9, wherein before the determining, by the main thread, the target task thread, the operations further comprise:

in response to a trigger request for a data transmission task, generating the data packet for communicating with the client device based on the address and the port number of the client device; and in response to determining that the data packet is generated, determining that the data transmission task is detected.

16. The non-transitory computer-readable storage medium claim 9, wherein the data packet carries the address and the port number of the client device, and wherein the operations further comprise:

obtaining the address and the port of the client device that are carried in the data packet;

determining whether there exists the first file descriptor corresponding to the client device based on the address and the port of the client device;

in response to determining that there exists the first file descriptor corresponding to the client device, communicating with the client device by using the first file descriptor; and in response to determining that the first file descriptor corresponding to the client device does not exist, creating the first file descriptor corresponding to the client device based on the address and the port number of the client device and the address and the port number of a data transmission server.

17. The non-transitory computer-readable storage medium claim 9, wherein the communicating with the client device by using the first file descriptor to perform data transmission further comprises:

monitoring the first file descriptor;

determining whether there is data exchange for the first file descriptor within a preset duration; and stopping monitoring the first file descriptor in response to determining that there is no data exchange for the first file descriptor within the preset duration.

\* \* \* \* \*